United States Patent
Roy et al.

(10) Patent No.: US 8,150,345 B2
(45) Date of Patent: Apr. 3, 2012

(54) SIMPLIFIED INTERFERENCE SUPPRESSION IN MULTI-ANTENNA RECEIVERS

(75) Inventors: Subhadeep P. Roy, Hillsborough, NJ (US); Niranjan N. Ratnakar, Hillsborough, NJ (US); Sundeep Rangan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 12/413,527

(22) Filed: Mar. 28, 2009

(65) Prior Publication Data

US 2009/0247107 A1   Oct. 1, 2009

Related U.S. Application Data

(60) Provisional application No. 61/041,217, filed on Mar. 31, 2008.

(51) Int. Cl.
 *H04B 17/02* (2006.01)
(52) U.S. Cl. .......................................... 455/135; 455/133
(58) Field of Classification Search ........... 455/132–135
See application file for complete search history.

(56) References Cited

U.S. PATENT DOCUMENTS

| | | | | |
|---|---|---|---|---|
| 6,144,711 | A * | 11/2000 | Raleigh et al. ................. | 375/347 |
| 6,907,272 | B2 | 6/2005 | Roy | |
| 2007/0072551 | A1 * | 3/2007 | Pajukoski et al. ............. | 455/63.1 |
| 2008/0159451 | A1 * | 7/2008 | Majonen ....................... | 375/346 |
| 2009/0247107 | A1 * | 10/2009 | Roy et al. ....................... | 455/307 |
| 2009/0323847 | A1 * | 12/2009 | Na et al. ........................ | 375/267 |
| 2010/0067366 | A1 * | 3/2010 | Nicoli ............................ | 370/210 |
| 2010/0067632 | A1 * | 3/2010 | Jia ................................. | 375/371 |
| 2010/0103810 | A1 * | 4/2010 | Kloos et al. ................... | 370/204 |
| 2010/0150259 | A1 * | 6/2010 | Castelain et al. ............. | 375/267 |
| 2010/0158151 | A1 * | 6/2010 | Krauss et al. ................. | 375/267 |
| 2010/0238846 | A1 * | 9/2010 | Xu et al. ........................ | 370/280 |
| 2010/0238984 | A1 * | 9/2010 | Sayana et al. ................. | 375/219 |
| 2011/0019771 | A1 * | 1/2011 | Raleigh et al. ................ | 375/299 |
| 2011/0060956 | A1 * | 3/2011 | Goldsmith et al. ........... | 714/746 |
| 2011/0075601 | A1 * | 3/2011 | Zheng ........................... | 370/316 |
| 2011/0080264 | A1 * | 4/2011 | Clare et al. ................... | 340/10.1 |

(Continued)

FOREIGN PATENT DOCUMENTS

| | | |
|---|---|---|
| EP | 1084536 A1 | 3/2001 |
| WO | WO2007149394 | 12/2007 |

OTHER PUBLICATIONS

Cavalcanti F R P et al: "Performance evaluation of sub-space techniques for array processing in TDMA systems" IEEE 54th Vehicular Technology Conference. VTC Fall 2001. Proceedings Oct. 7, 2001-Oct. 11, 2001 Atlantic City, NJ, USA, vol. 3, pp. 1264-1268 vol. XP002533952 IEEE 54th Vehicular Technology Conference. VTC Fall 2001. Proceedings (Cat. No. 01CH37211) IEEE Piscataway, NJ, USA ISBN: 0-7803-7005-8 p. 1265, left-hand column, paragraph 2—p. 1266, left-hand column, paragraph 2.

(Continued)

*Primary Examiner* — Lincoln Donovan
*Assistant Examiner* — Adam Houston
(74) *Attorney, Agent, or Firm* — Stanton Braden

(57) ABSTRACT

A signal received via a plurality of antennas, and containing an interference component and a desired communication component, is processed to suppress the interference component. The interference component is suppressed based on an inverse of a spatial covariance matrix, which inverse is produced without performing a matrix inversion operation.

24 Claims, 4 Drawing Sheets

U.S. PATENT DOCUMENTS

2011/0080267 A1* 4/2011 Clare et al. .................. 340/10.4
2011/0080965 A1* 4/2011 Liu et al. ...................... 375/260
2011/0105033 A1* 5/2011 Monogioudis et al. ...... 455/63.1
2011/0105051 A1* 5/2011 Thomas et al. ................ 455/69
2011/0122968 A1* 5/2011 Jongren et al. ............... 375/296
2011/0144511 A1* 6/2011 Zhang et al. .................. 600/510

OTHER PUBLICATIONS

International Search Report and the Written Opinion—PCT/US2009/038841, International Search Authority—European Patent Office—Jul. 31, 2009.

* cited by examiner

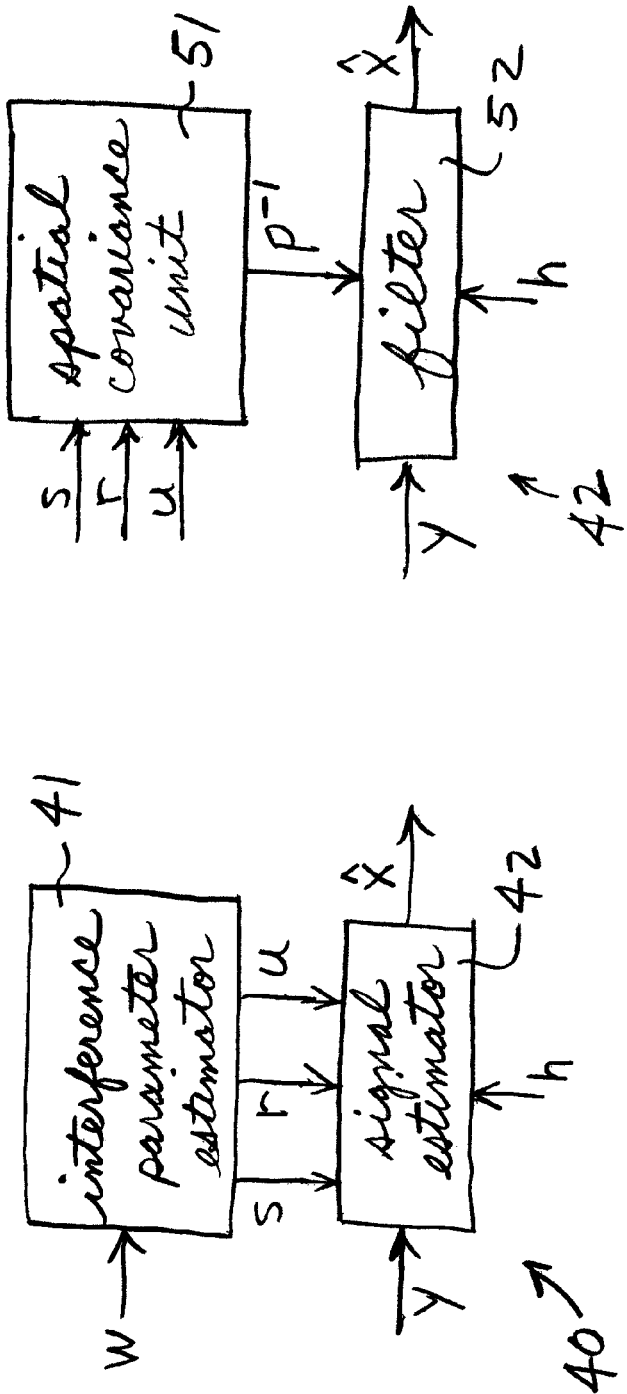
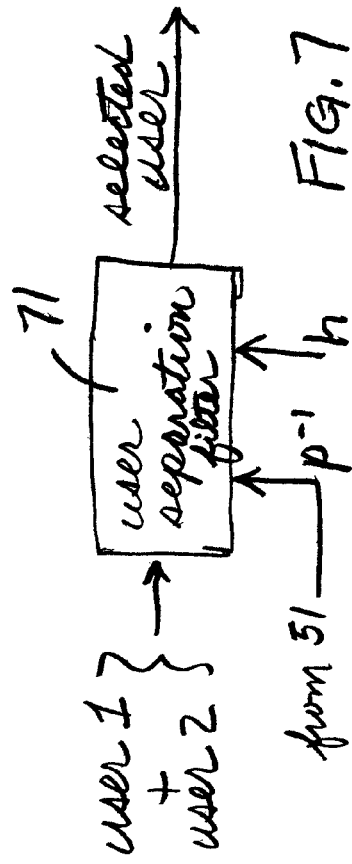

SIMPLIFIED INTERFERENCE SUPPRESSION IN MULTI-ANTENNA RECEIVERS

CLAIM OF PRIORITY UNDER 35 U.S.C. §119

The present Application for Patent claims priority to Provisional Application No. 61/041,217 filed Mar. 31, 2008, and assigned to the assignee hereof and hereby expressly incorporated by reference herein.

BACKGROUND

1. Field

The present disclosure relates generally to wireless communication and, more particularly, to interference suppression in wireless communication.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Interference suppression in conventional multi-antenna receivers assumes uncorrelated interference across the receive antennas. This approach is sub-optimal in the presence of a single dominant interferer on the same time-frequency resource as the desired communication. It is therefore desirable to provide for improvement in interference suppression employed by multi-antenna receivers.

SUMMARY

A signal received via a plurality of antennas, and containing an interference component and a desired communication component, is processed to suppress the interference component. The interference component is suppressed based on an inverse of a spatial covariance matrix. The inverse of the spatial covariance matrix is produced without performing a matrix inversion operation.

BRIEF DESCRIPTION OF THE DRAWINGS

Various aspects of a wireless communications system are illustrated by way of example, and not by way of limitation, in the accompanying drawings, wherein:

FIG. 4 diagrammatically illustrates an interference suppression apparatus according to exemplary embodiments of the present work;

FIG. 5 diagrammatically illustrates the signal estimator of FIG. 4 according to exemplary embodiments of the present work;

FIG. 7 diagrammatically illustrates exemplary embodiments of the present work in a Space-Division Multiple Access (SDMA) environment.

DETAILED DESCRIPTION

Figure 1:
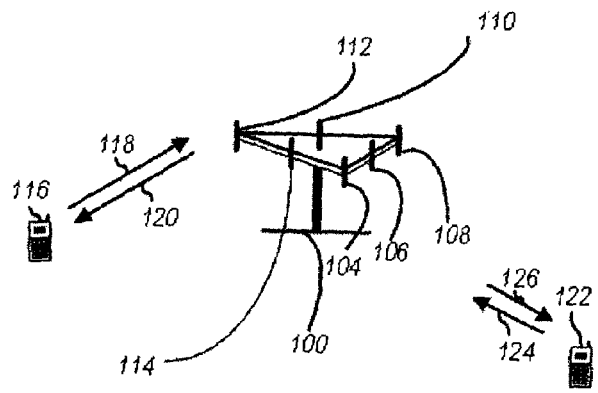
FIG. 1 diagrammatically illustrates a multiple access wireless communication system to which the present work may be applied.

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work.

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called user equipment (UE), a wireless communication device, terminal, access terminal or some other terminology.

Figure 2:
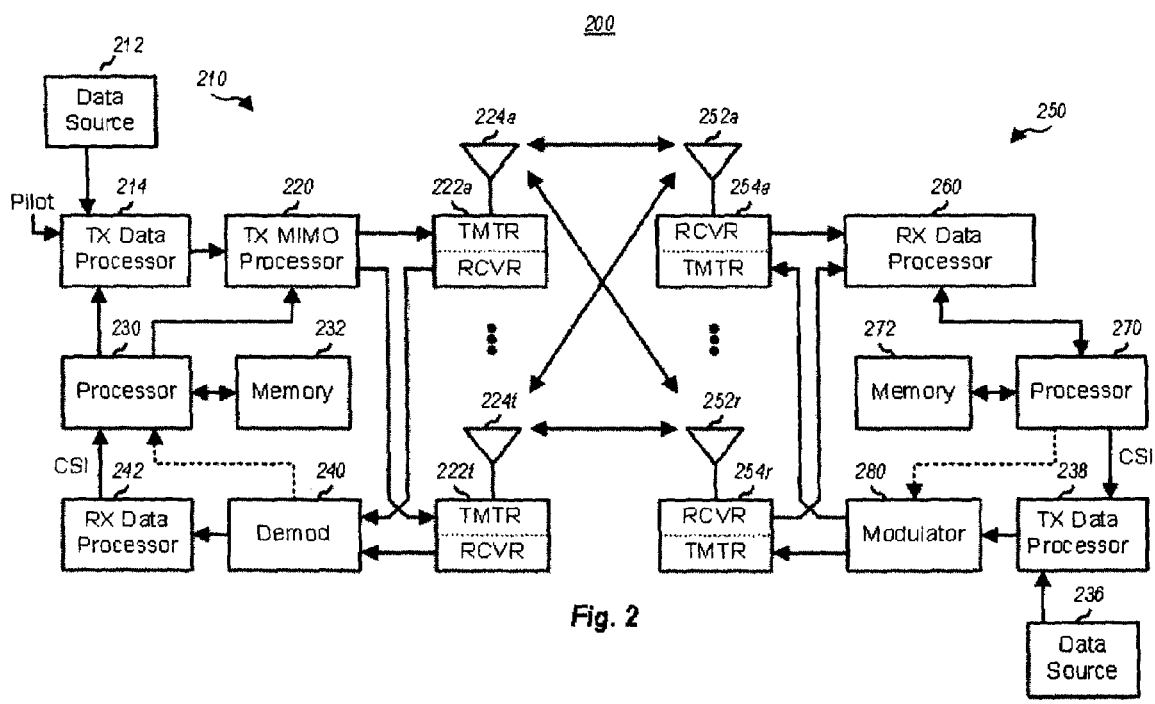
FIG. 2 diagrammatically illustrates a communication system in which exemplary embodiments of the present work may be implemented.

FIG. 2 diagrammatically illustrates a MIMO communication system 200 in which exemplary embodiments of the present work may be implemented. The system 200 includes a transmitter system 210 (either an access point or a user terminal) and a receiver system 250 (either a user terminal or an access point). In embodiments where the transmitter system 210 is an access point, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

In embodiments where the receiver system 250 is a user terminal, the transmitted modulated signals from the transmitter system 210 are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
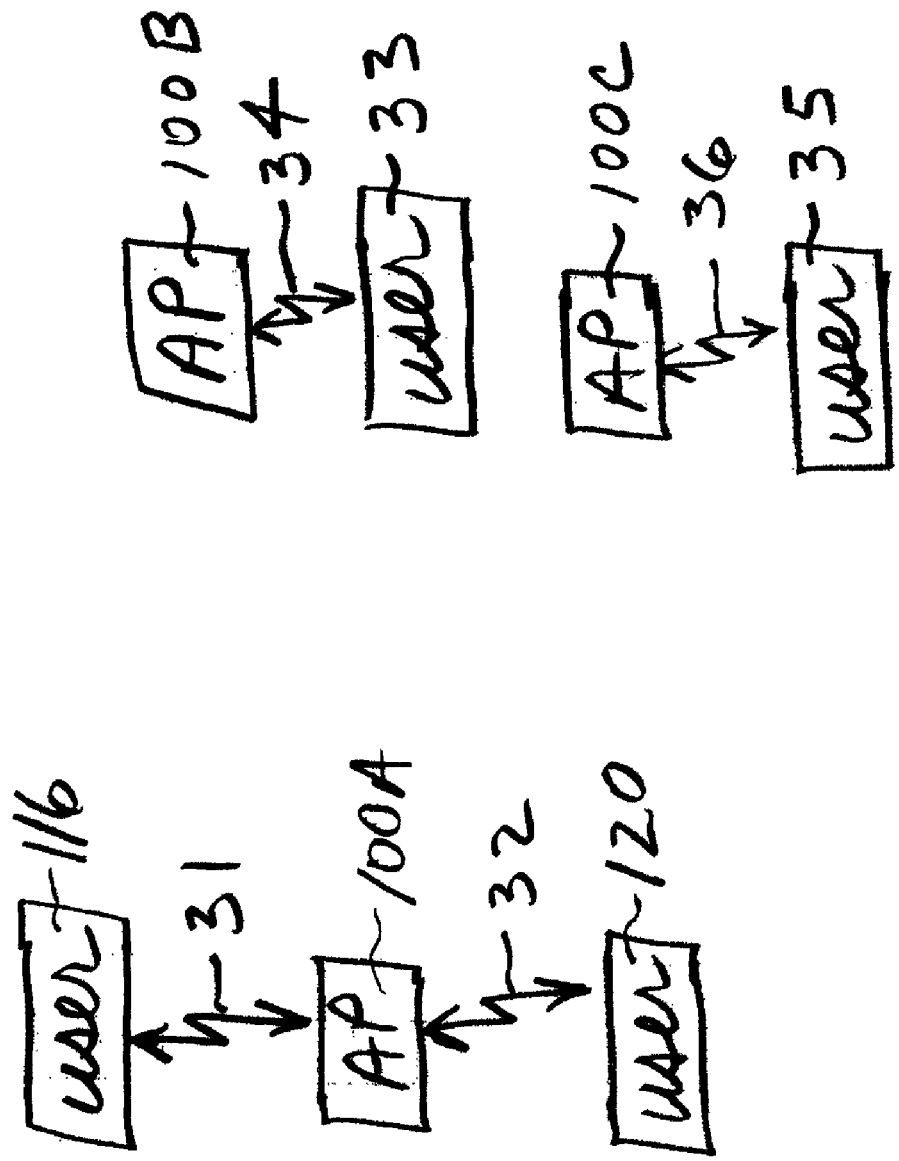
FIG. 3 diagrammatically illustrates an example of an interference scenario in a multi-cell, multi-user environment.

FIG. 3 diagrammatically illustrates an example of a multi-cell (each access point AP corresponding to a cell), multi-user network in which exemplary embodiments of the present work are applicable. Mobile user terminals 116 and 120 communicate at 31 and 32, respectively, with the access point 100A, mobile user terminal 33 communicates at 34 with access point 100B, and mobile user terminal 35 communicates at 36 with access point 100C. If the communication 34 uses the same time-frequency resource as the communication 31, then the communication 34 may be a dominant interferer with respect to the communication 31. Similarly, if the communication 36 uses the same time-frequency resource as the communication 32, then the communication 36 may be a dominant interferer with respect to the communication 32.

The present work recognizes that, in a receiver (e.g., receiver 250 in FIG. 2) with multiple receive antennas, interference from another user on the same time-frequency resource is highly correlated spatially across the antennas, and has a distinct spatial signature. As mentioned above, conventional multi-antenna receivers assume uncorrelated interference across the receive antennas. However, such conventional receivers are sub-optimal in the presence of a single dominant interferer on the same time-frequency resource. Exemplary embodiments of the present work provide a receiver that estimates parameters of the spatially correlated interference, and uses the estimated parameters to estimate efficiently the desired user's signal.

The most direct way to exploit the spatial correlation of the interference is to estimate a spatial correlation matrix, and then apply a so-called whitening filter to the received communication signal. If the spatial correlation matrix is estimated without error, this method is theoretically optimal. However, the whitening filter must be produced by inverting the spatial correlation matrix, whose dimension is equal the number of receive antennas. For even a small number of antennas, e.g., four, the matrix inversion computation is prohibitive. Also, the whitening filter will be sensitive to estimation errors in the spatial correlation matrix.

Exemplary embodiments of the present work use the procedure summarized below to suppress the interference described with respect to FIG. 3.

1) Assume that the interference is caused by a single dominant interferer (e.g., communication 34 interferes with communication 31 in FIG. 3) and additive Gaussian noise, where the additive Gaussian noise powers need not be the same on all the receive antennas.

2) For every time-frequency resource block (e.g., OFDM tile) collect empirically measured interference (+noise) samples for all the receive antennas, and compute a covariance matrix from the samples.

3) Using the empirical covariance matrix, compute the spatial signature (direction) of the dominant interferer, and the additive Gaussian noise power.

4) Using the computation results of steps 2 and 3 above, compute the power of the dominant interferer.

5) Use the computation results from steps 3 and 4 to design a suitable interference suppression filter.

The procedure described above is presented in more detail below.

At a communication apparatus (access point or mobile user terminal) with a plurality of receiver antennas, the received signal consists of a desired signal+interference+additive noise. This is modeled by $$y = hx + (g_1 x_1 + \ldots + g_m x_m) + v = hx + w$$

where
- y=received signal. Dimension=number of receive antennas
- x=Transmitted symbol to be estimated
- h=estimated channel of the transmitted symbol
- $g_i x_i$=interference from user i
- v=additive Gaussian noise
- w=effective total noise A conventional linear minimum mean squared error (MMSE) receiver employs a whitening filter and applies it to y to produce the estimated signal as $$\hat{x} = f'y,$$

where $f = P^{-1}h$ \hfill (1)

and P is the spatial covariance matrix of noise+interference from other users, given by $$P = \sigma_1^2 g_1 g_1' + \ldots + \sigma_m^2 g_m g_m' + \sigma_v^2 I$$

As mentioned above, the most direct way to exploit the aforementioned spatial correlation of the interference is to estimate the spatial covariance matrix P, invert it, compute the whitening filter f, and then apply it to the received signal y. If the spatial covariance matrix P is estimated without error, this method is theoretically optimal. However in practice such an estimate will have estimation errors, and the inversion of such an estimated matrix directly leads to an unstable whitening filter. Moreover, computing the inverse of P directly is computationally prohibitive even for a small number of antennas.

Exemplary embodiments of the present work exploit the unique spatial structure of the covariance matrix P and use it to greatly simplify the whitening filter computation. Direct computation of the inverse of P is not required. Rather, P is characterized by three parameters, and the inverse of P is computed as a function of these three parameters. In some embodiments, this is accomplished as follows.

Assuming that the overall interference is dominated by a single dominant interferer on top of Gaussian noise, the structure of the spatial covariance matrix P becomes $$P = sI + ruu', \|u\| = 1$$

where s is the power of the additive Gaussian noise, r is the power of the interferer and u is the direction of the interference. Thus P is characterized by the three parameters s, r and u. In some embodiments, these parameters are estimated as follows.

1. For every time-frequency resource block (e.g., OFDM tile) collect N empirically measured interference+noise samples w for all receive antennas. This may be done using dedicated pilot symbols according to conventional techniques. In some embodiments, w is produced by the RX data processor 260 of FIG. 2.

2. Compute an empirical covariance matrix based on the collected samples as $$R = \frac{1}{N} \sum_{j=1}^{N} w_j w_j'. \tag{2}$$

where N is the number of interference+noise samples, and the dimension of vector w is equal to the number of receive antennas.

3. Compute u as the largest eigenvector of R. The largest eigenvector of R is the eigenvector that corresponds to the largest eigenvalue of R. Some embodiments determine this eigenvector using one iteration of a conventional iterative power algorithm.

4. Compute the noise power s and the interference power r as $$s = \frac{1}{n_R - 1} (\text{trace}(R) - u'Ru), \qquad (3)$$

$$r = u'Ru - s \qquad (4)$$

where $n_R$ is the number of receive antennas.

5. Compute the desired inverse of the matrix P directly as $$P^{-1} = \frac{1}{s} I - \frac{r}{s(r+s)} uu' \qquad (5)$$

FIG. 4 diagrammatically illustrates an interference suppression apparatus according to exemplary embodiments of the present work. In the apparatus of FIG. 4, an interference parameter estimator 41 produces the parameters s, r and u based on the interference+noise samples w. A signal estimator 42 uses these parameters together with the conventionally available channel estimate h to produce x̂ (the estimate of the transmitted symbol x) in response to the received signal y. In some embodiments, the interference suppression apparatus of FIG. 4 is implemented by the RX data processor 260 of FIG. 2 (including providing w and h according to conventional techniques).

FIG. 5 diagrammatically illustrates the signal estimator 42 of FIG. 4 according to exemplary embodiments of the present work. In FIG. 5, a spatial covariance unit 51 combines the estimated parameters s, r and u according to equation (5) to calculate $P^{-1}$ (the inverse of the spatial covariance matrix P) directly. A filter 52 combines $P^{-1}$ and the channel estimate h according to equation (1) to produce the estimated symbol x̂.

Figure 6:
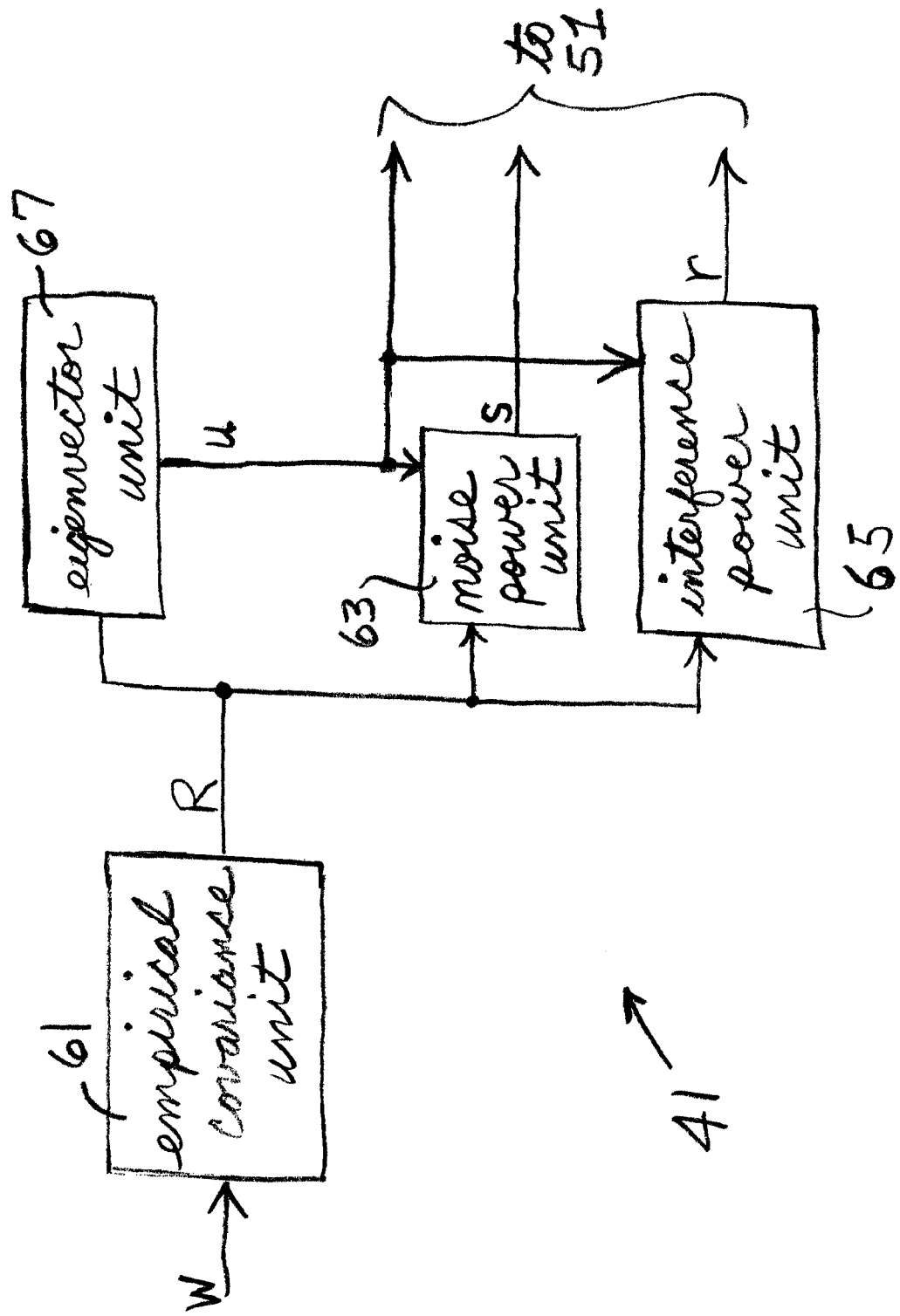
FIG. 6 diagrammatically illustrates the interference parameter estimator of FIG. 4 according to exemplary embodiments of the present work.

FIG. 6 diagrammatically illustrates the interference parameter estimator 41 of FIG. 4 according to exemplary embodiments of the present work. In FIG. 6, an empirical covariance unit 61 implements equation (2) to produce the empirical covariance matrix R based on the interference+noise samples w. The matrix R is provided to a parameter estimation apparatus that includes a noise power unit 63, an interference power unit 65, and an eigenvector unit 67. The eigenvector unit 67 determines the largest eigenvector of R, and outputs it as u. The noise power unit 63 implements equation (3) to calculate the noise power s based on R, and the interference power unit 65 implements equation (4) to calculate the interference power r based on R.

FIG. 7 diagrammatically illustrates exemplary embodiments of the present work applied in an SDMA (Space-Division Multiple Access) environment. A conventional SDMA user separation filter, shown at 71 in FIG. 7, receives input signaling that contains communication components associated with two different users, user 1 and user 2. The user separation filter 71 suppresses one of the user communication components in order to obtain the other user communication component. For example, if it is desired to obtain from the input signaling the communication component associated with user 1, an inverse spatial covariance matrix $P^{-1}$ is computed (in conventional fashion by estimating P and then inverting it) for user 2, and is provided as input to the user separation filter 71, together with the channel h that has been estimated for user 2. The user separation filter 71 uses the $P^{-1}$ and h inputs to suppress the user 2 communication component of the input signaling, thereby obtaining the desired user 1 communication component.

According to exemplary embodiments of the present work, the inverse spatial covariance matrix $P^{-1}$ produced by the spatial covariance unit 51 of FIG. 5 is provided to the user separation filter 71. Continuing with the example of obtaining the user 1 communication component, the undesired interference from another user on the same time-frequency resource would correspond to the user 2 communication component in SDMA. Thus, the user separation filter 71 suppresses the interference component, and thereby provides the desired user 1 communication component at its output.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A method for use in a wireless communication receiver having a plurality of antennas, comprising:
   receiving via said antennas a signal that contains an interference component and a desired communication component that are both carried by a common time-frequency resource;
   providing a covariance matrix that is indicative of noise in the received signal;
   using said covariance matrix to estimate information indicative of said interference component;
   estimating an inverse of a spatial covariance matrix based on said information; and
   suppressing said interference component based on said estimated inverse of the spatial covariance matrix.

2. The method of claim 1, wherein said signal is an OFDM signal.

3. The method of claim 2, wherein said information includes an eigenvector of said covariance matrix.

4. The method of claim 3, wherein said eigenvector is a largest eigenvector of said covariance matrix.

5. The method of claim 3, wherein said eigenvector is indicative of a directional characteristic of said interference component.

6. The method of claim 1, wherein said information includes power information indicative of a power characteristic of said interference component and directional information indicative of a directional characteristic of said interference component.

7. The method of claim 6, wherein said information includes further power information indicative of a power characteristic of a further interference component of said signal.

8. The method of claim 7, wherein said directional information includes an eigenvector of said covariance matrix.

9. The method of claim 6, wherein said directional information includes an eigenvector of said covariance matrix.

10. The method of claim 1, wherein said information includes information indicative of a further interference component of said signal.

11. The method of claim 1, wherein said providing includes estimating said covariance matrix based on empirical information indicative of said noise.

12. A wireless communication receiver apparatus, comprising:
    means for receiving via a plurality of antennas a signal that contains an interference component and a desired communication component that are both carried by a common time-frequency resource;
    means for providing a covariance matrix that is indicative of noise in the received signal;
    means for using said covariance matrix to estimate information indicative of said interference component;
    means for estimating an inverse of a spatial covariance matrix based on said information; and
    means for suppressing said interference component based on said estimated inverse of the spatial covariance matrix.

13. The apparatus of claim 12, wherein said information includes power information indicative of a power characteristic of said interference component and directional information indicative of a directional characteristic of said interference component.

14. The apparatus of claim 13, wherein said information includes further power information indicative of a power characteristic of a further interference component of said signal.

15. A wireless communication receiver apparatus, comprising:
    a plurality of antennas for receiving a signal that contains an interference component and a desired communication component that are both carried by a common time-frequency resource;
    a covariance unit coupled to said antennas and configured to provide a covariance matrix that is indicative of noise in the received signal;
    an estimation apparatus coupled to said covariance unit and configured to use said covariance matrix to estimate information indicative of said interference component;
    a spatial covariance unit coupled to said estimation apparatus and configured to estimate an inverse of a spatial covariance matrix based on said information; and
    a filter coupled to said antennas and said spatial covariance unit, said filter configured to suppress said interference component based on said estimated inverse of the spatial covariance matrix.

16. The apparatus of claim 15, wherein said information includes power information indicative of a power characteristic of said interference component and directional information indicative of a directional characteristic of said interference component.

17. The apparatus of claim 16, wherein said information includes further power information indicative of a power characteristic of a further interference component of said signal.

18. A computer program product for supporting wireless communication, comprising:
    a computer-readable medium comprising:
        code for causing at least one data processor to produce, for a signal received via a plurality of antennas and containing an interference component and a desired communication component that are both carried by a common time-frequency resource, a covariance matrix that is indicative of noise in the received signal;
        code for causing the at least one data processor to use said covariance matrix to estimate information indicative of said interference component;
        code for causing the at least one data processor to estimate an inverse of a spatial covariance matrix based on said information; and
        code for causing the at least one data processor to suppressing said interference component based on said estimated inverse of the spatial covariance matrix.

19. The computer program product of claim 18, wherein said information includes power information indicative of a power characteristic of said interference component and directional information indicative of a directional characteristic of said interference component.

20. The computer program product of claim 19, wherein said information includes further power information indicative of a power characteristic of a further interference component of said signal.

21. A method for use in a wireless communication receiver having a plurality of antennas, comprising:
- receiving via said antennas a signal that contains an interference component and a desired communication component that are both carried by a common time-frequency resource;
- estimating power information indicative of a power characteristic of said interference component and directional information indicative of a directional characteristic of said interference component;
- estimating an inverse of a spatial covariance matrix based on said power information and said directional information; and
- suppressing said interference component based on said estimated inverse of the spatial covariance matrix.

22. A wireless communication receiver apparatus, comprising:
- means for receiving via a plurality of antennas a signal that contains an interference component and a desired communication component that are both carried by a common time-frequency resource;
- means for estimating power information indicative of a power characteristic of said interference component and directional information indicative of a directional characteristic of said interference component;
- means for estimating an inverse of a spatial covariance matrix based on said power information and said directional information; and
- means for suppressing said interference component based on said estimated inverse of the spatial covariance matrix.

23. A wireless communication receiver apparatus, comprising:
- a plurality of antennas for receiving a signal that contains an interference component and a desired communication component that are both carried by a common time-frequency resource;
- an estimator coupled to said antennas and configured to estimate power information indicative of a power characteristic of said interference component and directional information indicative of a directional characteristic of said interference component;
- a spatial covariance unit coupled to said estimation apparatus and configured to estimate an inverse of a spatial covariance matrix based on said power information and said directional information; and
- a filter coupled to said antennas and said spatial covariance unit, said filter configured to suppress said interference component based on said estimated inverse of the spatial covariance matrix.

24. A computer program product for supporting wireless communication, comprising:
- a computer-readable medium comprising:
  - code for causing at least one data processor to estimate, for a signal received via a plurality of antennas and containing an interference component and a desired communication component that are both carried by a common time-frequency resource, power information indicative of a power characteristic of said interference component and directional information indicative of a directional characteristic of said interference component;
  - code for causing the at least one data processor to estimate an inverse of a spatial covariance matrix based on said power information and said directional information; and
  - code for causing the at least one data processor to suppress said interference component based on said estimated inverse of the spatial covariance matrix.

* * * * *